United States Patent

[11] 3,571,693

[72] Inventor Mahmoud Riaz
 Minneapolis, Minn.
[21] Appl. No. 777,818
[22] Filed Nov. 21, 1968
[45] Patented Mar. 23, 1971
[73] Assignee The United States of America as represented by the Administrator of the National Aeronautics and Space Administration

[54] CONSTANT FREQUENCY OUTPUT TWO-STAGE INDUCTION MACHINE SYSTEMS
 12 Claims, 6 Drawing Figs.
[52] U.S. Cl. .................................................. 322/32,
 321/61, 321/64
[51] Int. Cl. .................................................. H02p 9/42
[50] Field of Search .................................................. 322/29, 32,
 28; 321/61, 64, 4

[56] References Cited
UNITED STATES PATENTS

| | | | |
|---|---|---|---|
| 3,070,741 | 12/1962 | Ford | 322/32X |
| 3,109,976 | 11/1963 | Sichling | 321/4 |
| 3,378,756 | 4/1968 | Potter | 321/61X |

Primary Examiner—Oris L. Rader
Assistant Examiner—H. Huberfeld
Attorneys—John R. Manning, Russell E. Schlorff and Marvin F. Matthews ABSTRACT: A system employing double-induction machines and being capable of providing constant-frequency electrical power from a variable speed drive or of operating as a controlled speed motor from a constant-frequency source. The disclosed system employs two polyphase, wound-rotor induction machines mounted on the same shaft and having their rotor windings connected in a reverse phase sequence and their stator windings interconnected by means of a direct-current link-type of static frequency changer.

INVENTOR
MAHMOUD RIAZ
BY John R. Manning
ATTORNEYS

CONSTANT FREQUENCY OUTPUT TWO-STAGE INDUCTION MACHINE SYSTEMS

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

1. Field of the Invention

The present invention relates to the generation of electric power and to the driving of rotating loads. More particularly, the present invention is directed to systems employing machinery of the induction type, such systems being capable of generating constant-frequency power with variable-speed drive and also being capable of operating as motors which run at closely controlled speeds from a conventional constant-frequency power supply. Accordingly, the general objects of the present invention are to provide novel and improved methods and apparatus of such character.

2. Description of the Prior Art

While not limited thereto in its utility, the present invention is particularly well suited for employment on vehicles. The problem of generating constant-frequency alternating current when the output shaft speed of the prime mover is variable is of long standing and is particularly pronounced when the prime mover is, for example, an aircraft engine. Previous attempts at solving this problem have concentrated on two basic approaches. The first approach has been the development of constant-speed drives capable of converting the variable output shaft speed of, for example, turbomachinery to a constant shaft speed for driving an AC generator. Such drive systems are normally hydraulic but may also be pneumatic and mechanical. Regardless of type, all previous constant-speed drives were complex, generally lacking in reliability as a result of their complexity and relied upon external equipment such as pressurized fluid sources for proper operation.

In an attempt to avoid the use of the above briefly discussed hydraulic or hydromechanical constant-speed drive systems, interest has been directed to all electric constant-speed drives wherein a variable speed generator is typically connected to a motor which is in turn controlled to run at constant speed. Again, the controls for such systems have been quite complex and thus lacking in reliability. Further, such systems are inherently heavy and bulky.

Because of their well-known properties of simplicity, low cost and ruggedness, a manner of using polyphase induction machines as constant frequency, variable speed AC generators has long been sought. It is well known that polyphase induction machines may operate as generators when driven above synchronous speed and that synchronizing procedure is not necessary when such induction generators are paralleled. However, for the reasons to be briefly discussed below, previous induction generator systems have failed to provide an adequate constant-frequency power supply when the prime mover has subject to a wide range of output shaft speeds.

The conventional electrical induction machine with a short-circuited rotor operates very inefficiently when large speed changes are encountered because it is essentially a slip-type device. As is well known, high-slip operation as is encountered when prime mover shaft speed varies must be accompanied by correspondingly high rotor losses and thus low conversion efficiency. While there have been various proposals for effecting control over induction machinery by means of complex electronic circuitry to thereby permit the running of such machinery at high efficiency regardless of slip, such schemes have been accompanied by relatively low power-factor operation and the required complexity of the control circuitry has resulted in impaired reliability. It is also to be noted that a basic limitation of all of the previous induction machinery schemes has been the necessity of having slip rings in order to permit connection to the rotor windings of the machine. In addition, serious brush problems have been encountered with large machines running at high speeds and drawing large currents.

Induction machines having no sliding contacts or commutators whereby all control may be effected on the stationary member have been known for some time in the form of double-induction machines. As indicated by British Pat. No. 9534, the idea of combining two induction machines mounted on a common shaft may be attributed to Boucherot who, in 1900, proposed a composite motor with two stators and a common rotor. The double-induction machine has received consideration as a possible means for supplying constant-frequency AC power from a variable-speed drive. When the double-induction machine runs above synchronous speed, it is equivalent to an induction generator with variable stator to rotor coupling and the double-induction generator can thus function with variable slips. However, since there is no way of recovering the slip-frequency rotor power without introducing some rectifier-type device, the efficiencies of prior art double-induction generators have been directly governed by the value of slip exactly as in the case of the ordinary induction machine. Another basic disadvantage of prior art double-induction machine systems is that they cannot supply lagging reactive power which must then be furnished by suitable capacitors or synchronous machines connected in parallel.

As indicated above, double-induction generator systems have been considered for constant-frequency generation. However, as in the case of a single induction machine, such systems are inherently inefficient when operated over a wide speed range. For example, considering the arrangement described in U.S. Pat. Nos. 2,659,044, issued Nov. 10, 1953 to C. I. MacNeil, 2,747,107, issued May 22, 1956 to K. Polasek et al., and 2,829,333, issued Apr. 1, 1958 to W. L. Turrey, power in effect circulates between both members of the double-indluction machine so that no net power is delivered and a large amount of power must be dissipated in the rotor circuits at large slips with a concomitant low conversion efficiency. In order to improve the efficiency of prior art systems of the type exemplified by the aforementioned MacNeil, Polasek et al. and Turrey patents, it has been proposed that an undisclosed type of frequency changer device be connected between an additional and necessary source or sink of controlled variable-frequency power and one of the two stators of a double-induction generator so that the other stator can deliver power at a constant frequency. A system of this latter type is shown in U.S. Pat. No. 3,183,431 which issued May 11, 1965 to A. W. Ford. However, in systems such as those described by Ford, suitable sources of reactive power such as capacitors or synchronous machines are assumed to be connected to the constant-frequency terminals in order to supply the reactive demands of the machines and loads. Further, as noted above, systems of the type shown in the Ford patent substitute the problem of obtaining adjustable frequency power over a range of speeds for the problem of generating constant-frequency power for a variable-speed drive. It should further be noted that, for reasons which will become obvious from the description below of the present invention, no mention is made of how a double-induction machine of the type disclosed by Ford may be started or paralleled with other units.

SUMMARY OF THE INVENTION

The present invention overcomes the above-discussed and other disadvantages of the prior art by permitting the efficient use of induction machines which, as generators, can supply constant-frequency electrical power from a variable-speed drive and also which, as motors, can run at closely controlled speeds from a constant-frequency power supply. In accordance with the present invention, the novel induction machine system have no sliding contacts or commutators and all controls are affected on stator elements by means of static electronic devices. The induction machines of the present invention consist of two series-connected, mechanically coupled rotors, each rotor having a polyphase winding thereon and a polyphase stator winding associated therewith. The rotor windings are preferably connected in a reversed phase sequence while the stator windings are connected to one another through control circuitry which also comprises the system. The static electronic control system comprises a frequency changer which preferably consists of a rectifier circuit and a polyphase inverter circuit. The control of the motor speed or the level of the power generated by the induction machine is affected by adjusting the voltage ratio of the frequency changer thereby controlling the amount of variable-frequency power delivered from one state of the double-induction machine to the other.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which.

DESCRIPTION OF THE PREFERRED EMBODIMENT

Figure 1:
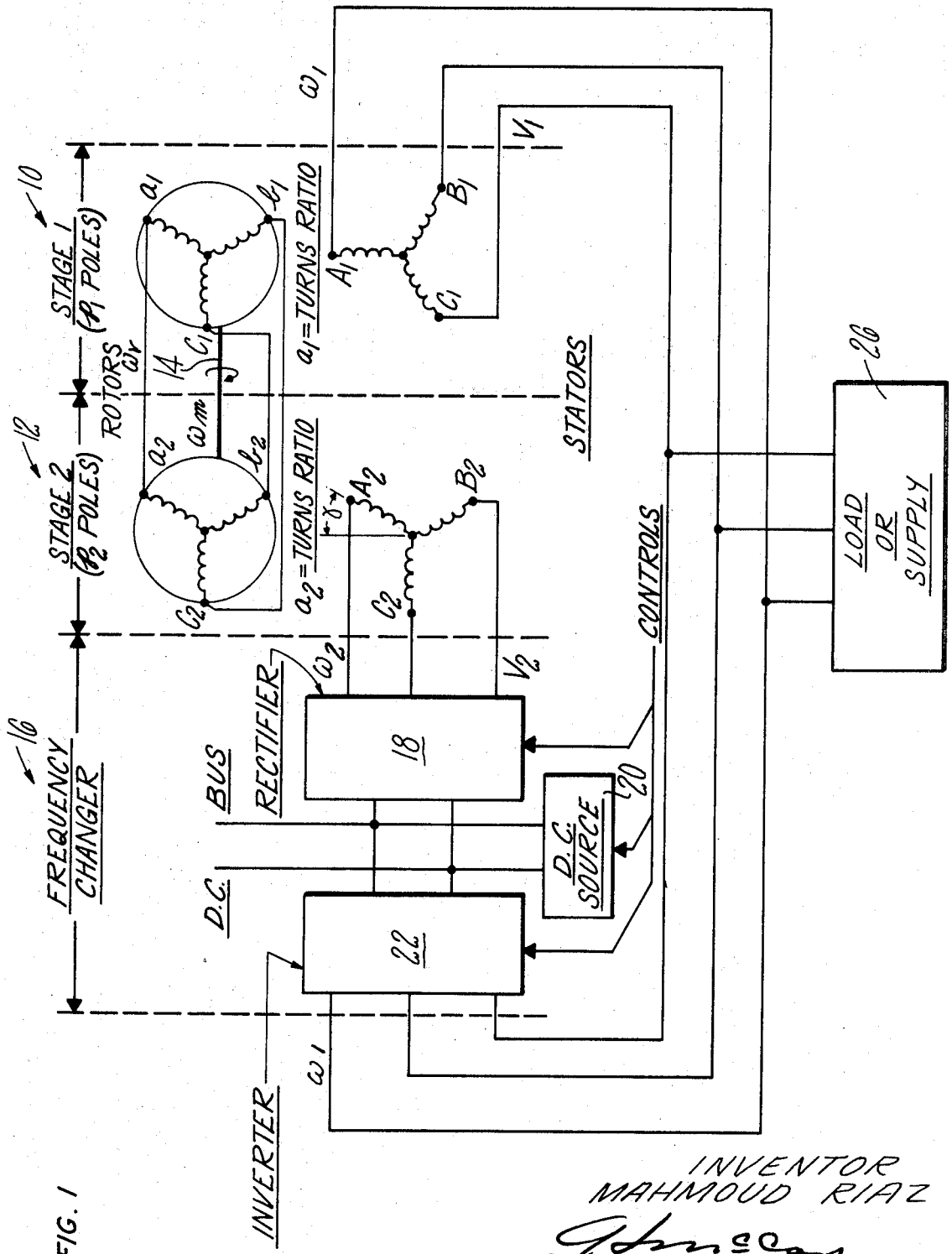
FIG. 1 is a schematic diagram of a preferred embodiment of the present invention.

With reference now to FIG. 1, a preferred arrangement for the present invention consists of two polyphase, wound-rotor induction machines which are mounted on the same shaft. In FIG. 1, the induction machines are indicated generally at 10 and 12 and comprise three-phase machines with their rotor windings connected in a reversed phase sequence. The rotor windings are indicated on FIG. 1 in the conventional manner with lower case letters, the subscript 1 being applied to the windings of machine 10, which is indicated as the first stage, and the subscript 2 being applied to the windings of machine 12, which is the second stage of the double-induction machine. The common shaft for machines 10 and 12 is indicated at 14. The stator windings for machines 10 and 12 have been schematically represented below the rotor windings, the stator windings being indicated by capital letters applied to the three phases. The stator and rotor windings of each machine are, of course, wound with the same pole number combination.

Machines 10 and 12 may be constructed adjacent to each other in a single housing with identical or different pole arrangements. Alternately, the double-induction machine may be constructed so as to place the stator and rotor windings of the two machines in the same magnetic structure but with different poles so as to eliminate coupling between stages. For typical double-induction machine structure, reference may be had to aforementioned Ford U.S. Pat. No. 3,183,431. It is also worthy of note that the windings in machines 10 and 12 can be designed with different rotor-to-stator turns ratios and with a built-in phase shift.

It is to be noted that the stator windings of machines 10 and 12 are shown as being connected in parallel through a static frequency changer indicated generally at 16. Alternately, the stator windings of machines 10 and 12 may be connected in series via frequency changer 16. A preferred configuration for the frequency changer employs what has become known in the art as a "DC link." Thus, the frequency changer comprises a rectifier unit 18 of a commercially available type which will convert the AC voltage induced in the stator winding of machine 12 to DC voltage. Frequency changer 16 also comprises a direct current source 20 and a solid-state static inverter 22. Static inverter 22 converts the direct voltage from rectifier 18 to the constant-frequency, constant amplitude of machine 10 of the double-induction machine.

There are two basic arrangements for frequency changer 16 which will result in the system providing an output at fixed frequency and voltage when operating in the generator mode. The difference in these two arrangements resides in whether input voltage control is affected in rectifier 18 or inverter 22. In a first configuration, frequency changer 16 operates at a substantially constant voltage established by rectifier section 18 which utilizes controlled-rectifier devices such as thyristors to produce the desired constant DC output from the variable AC input voltage derived from the stator of machine 12. It is to be noted that it is necessary to provide for small changes in the rectifier output voltage in order to compensate for the regulation characteristics of inverter 22 under varying operating conditions. The approach wherein control is exercised over the output of rectifier 18 has the advantage of providing a constant DC voltage bus from which DC power can be delivered to auxiliary loads. As will be obvious, excess DC power is available when the double-induction machine runs at high speeds. In addition, it is to be noted that the design and operation of inverter 22 is simplified if the input voltage thereto is fixed.

In the alternative approach, no control is exercised over rectifier 18 and the frequency changer will thus operate at a variable voltage level dictated by voltage level controls in inverter 22. It is, of course, possible to combine input voltage controls in both the inverter and rectifier sections of the frequency changer in order to regulate independently the DC and AC voltages obtainable from the system. Regardless of the control system, in all arrangements wherein relatively large amounts of power are desired, it has been found preferable for inverter 22 to be comprised of controlled-rectifier devices with some form of forced commutation. At low power levels, of course, inverters employing power transistors may be employed.

Figure 2:
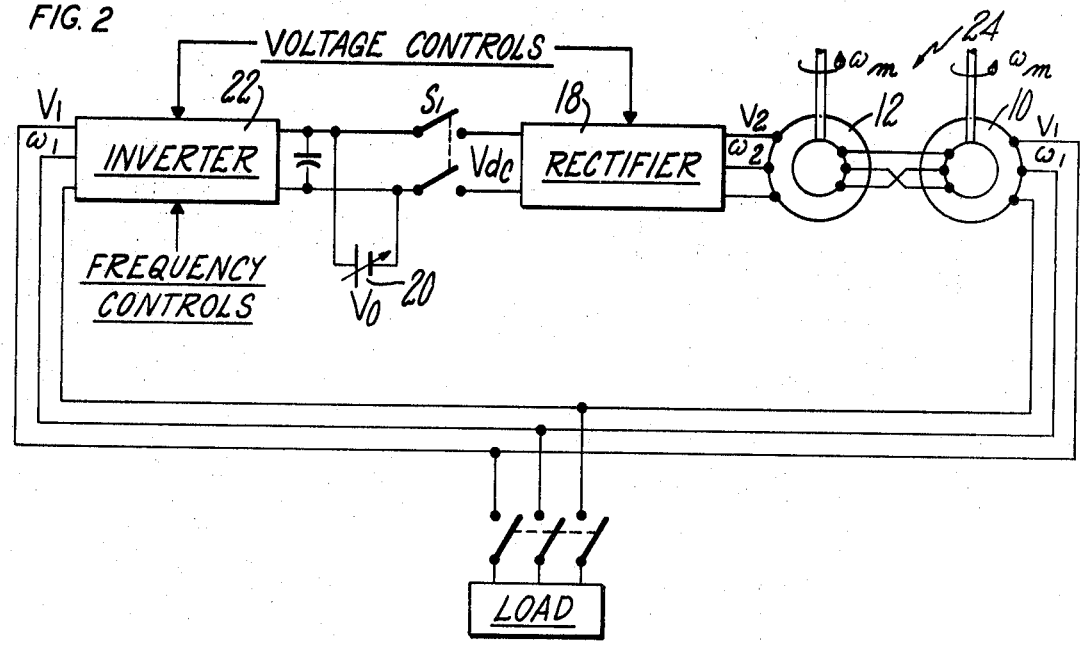
FIG. 2 is a block diagram depicting the embodiment shown schematically in FIG. 1.

The system of FIG. 1 has been shown in block diagram form in FIG. 2 with the double-induction motor comprised of machines 10 and 12 indicated at 24. As will be described in more detail below, control of the speed of or the power generated by the double-induction machine is affected by adjusting the voltage ratio of the frequency changer to thereby control the amount of variable-frequency power delivered by machine 12.

Figure 3A:
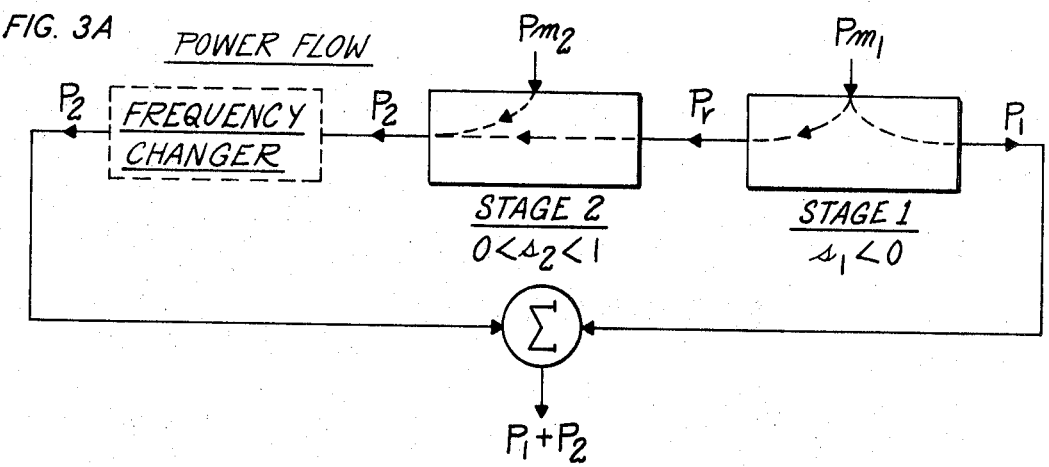
FIGS. 3A and 3B illustrate the basic principles underlying the operation of the double-induction machine system of the present invention.
Figure 3B:
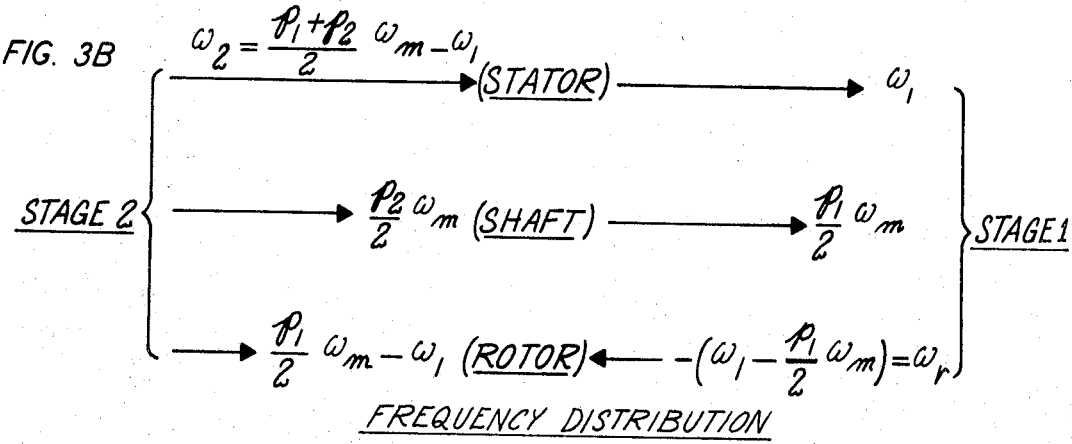

The operation of the present invention may be better understood by considering FIGS. 3A and 3B. The operational parameters and the manner in which the frequencies are distributed in machines 10 and 12 are as follows:

Stage 1 (machine 10)
Stator frequency $= \omega_1$ (constant)
Shaft speed $= \dfrac{p_1}{2} \omega_m$ $\left(\text{where } \omega_m = \dfrac{2\pi n}{60} \text{ and } n \text{ is the speed in r.p.m.}\right)$ Rotor frequency $= -\omega_r = \omega_1 - \dfrac{p_1}{2} \omega_m$ Slip $= s_1 = \dfrac{\omega_1 - \dfrac{p_1}{2} \omega_m}{\omega_1}$ Stage 2 (machine 12)
Stator frequency $= \omega_2 = -\left(\omega_1 - \dfrac{p_1 + p_2}{2} \omega_m\right)$ (variable)

Shaft Speed $= \dfrac{p_2}{2} \omega_m$

Rotor frequency $= \omega_r = -\left(\omega_1 - \dfrac{p_1}{2} \omega_m\right)$

Slip $= s_2 = \dfrac{\omega_2 - \dfrac{p_2}{2} \omega_m}{\omega_2}$ $= \dfrac{\omega_1 - \dfrac{p_1}{2} \omega_m}{\omega_1 - \left(\dfrac{p_1 + p_2}{2}\right) \omega_m} = \dfrac{s_1}{s_1(1+k) - k}$ where $p$ refers to the number of poles and $k$ denotes the pole ratio $p_2/p_1$. In the foregoing equations, all frequencies are expressed in electrical radians per second.

As a variable-speed constant-frequency generating system machine 10 operates as an induction generator driven above its synchronous speed, the slip $s_1$ thus being negative, and accordingly delivering constant-frequency power to its stator and slip power to its rotor and to the rotor of machine 12. In turn, machine 12 receives electrical power from machine 10 through its rotor while simultaneously receiving mechanical power through its shaft from the prime mover, not shown, and delivers variable-frequency power at its stator terminals. Thus, in effect, machine 12 acts as a second stage generator operating in a positive slip region, the slip $s_2$ being between zero and one. After frequency conversion in frequency changer 16, the power generated by machine 12 is added to that of machine 10 to supply the connected load 26 at a constant frequency. Since the current in the double-induction machine system depends on the difference between the voltages induced in the rotors of the two machines, the output power level may be adjusted by controlling the output voltage of machine 12 through the exercise of control over frequency changer 16. Thus, in the generator mode of operation, machine 10 of the two-stage induction generator system of the present invention may be viewed as a negative-resistance parametric amplifier in which the idler power is fed into the second stage (machine 12), machine 12 acting as an "up converter". Pumping of the two stages, machines 10 and 12, is done at frequencies $p_1/2$ $\omega m$ and $p_2/2$ $\omega m$. The basic principles underlying operation of the double-induction machine system of the present invention may be better understood by reference to FIGS. 3A and 3B; FIG. 3A depicting the power flow distribution in the two-stage machine when operating in the generator mode.

Since, in the generator mode of operation, machine 10 operates at a constant stator frequency, $\omega_1$, its slip is a direct measure of the speed of the system. Under no-load conditions, the slip $so$ of machine 10 is given by the relation:

$$\left(\frac{v_2}{v_1}\right)_0 = \frac{a_1}{a_2}\left[k - s_0 (1+k)\right]$$

where $a_1$ and $a_2$ are the rotor-to-stator turns ratios for machines 10 and 12, respectively, and where $V_1$ and $V_2$ are the stator voltages of machines 10 and 12, respectively, voltage $V_2$ being applied at the input of the frequency changer.

Figure 4:
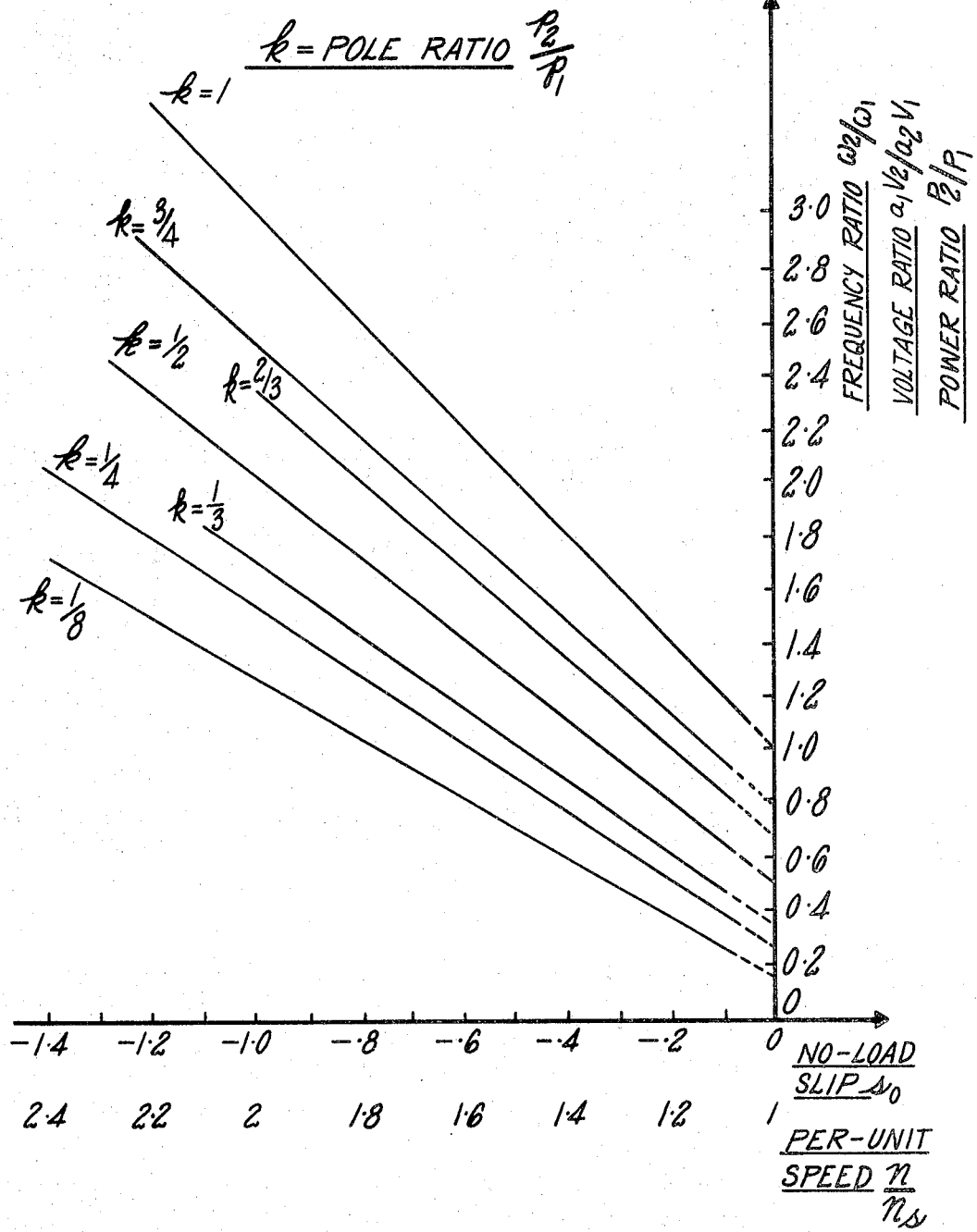
FIGS. 4 and 5 are graphical representations of the performance of the present invention when operated as a constant-frequency electrical power generator.
Figure 5:
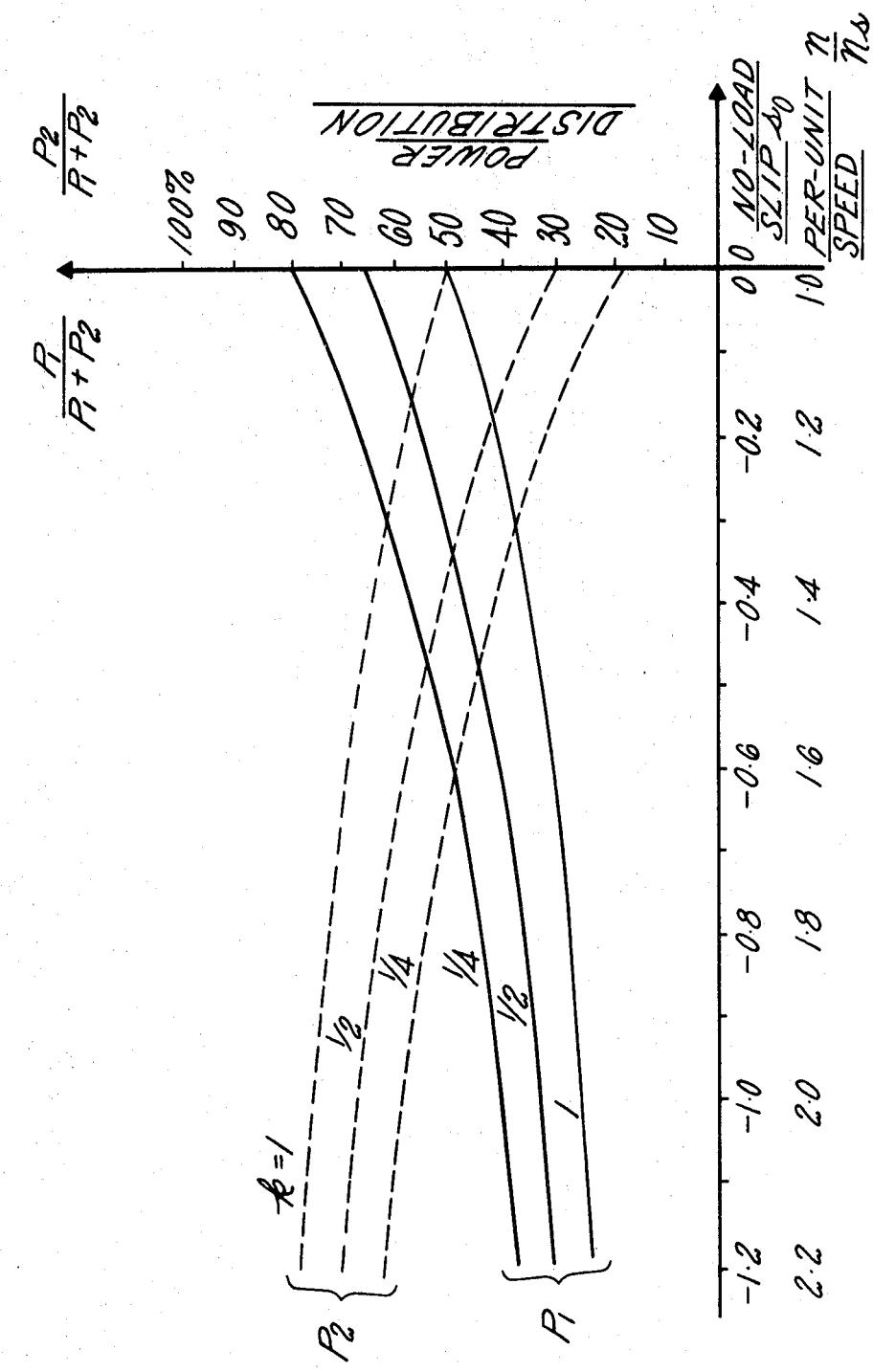

For a specified operating speed expressed by the slip $s_1$, the powers generated by the two stages depend upon the difference between the operating and no-load slips $s_1$ and $s_0$. The power level is thus a function of the voltage ratio of the frequency changer. Accordingly, the ratio of the power delivered to the load by the two machines is equal to:

$$\frac{a_2}{a_1}\left(\frac{V_2}{V_1}\right)_0$$

with the result that:

$$\frac{P_2}{P_1} = k - s_0 (1+k)$$

and $$\frac{P_1}{P_1+P_2} = \frac{1}{(1+k)(1-s_0)}$$

where $s_o$ is negative and $P$ denotes active power. The foregoing relations are shown graphically in FIGS. 4 and 5 which indicate that a small pole ratio $$k = \frac{p_2}{p_1}$$

yields a more uniform power level distribution in the two machines when the system operates over a large speed range (2 to 1 or more) as well as a substantial reduction in the maximum frequency and power generated by machine 12 at high speeds. For example, with $k = \frac{1}{4}$ at twice synchronous speed, machine 12 only delivers 60 percent of the power generated. This reduced power generation means that frequency changer 16 handles a correspondingly small power thereby increasing its operating efficiency over a wide range of working conditions.

It is also to be noted that one may take advantage of the freedom of choice of the turns ratios $a_1$ and $a_2$ to optimize the design of the frequency changer. A proper choice of the ratio $a_2/a01$ will permit the establishment of the appropriate voltage level at the input to the frequency changer at minimum speed of the double-induction machine. Accordingly, the turns ratios of the machine may be exploited to eliminate transformers from the frequency changer.

The basic characteristics underlying the performance of the variable-speed, constant-frequency generator system of the present invention may be more fully understood by considering the starting of such a unit. The machine will, of course, be driven by the prime mover at a speed $\omega_m$. The rectifier and inverter sections of the frequency changer are initially disconnected from each other as indicated by the open switch $S_1$ in FIG. 2. The output of DC voltage source 20 is impressed on the input of inverter 22 which thus supplies the no-load excitation magnetization of the induction machines. Accordingly, machine 10 is excited by a polyphase system of voltages of constant amplitude $V_1$ and constant frequency $\omega_1$ while machine 2 generates a polyphase set of voltages of varying magnitude $V_2$ and frequency $\omega_2$ governed by the speed of the prime mover. Rectification of the AC voltage $V_2$ establishes a DC voltage $V_{DC}$. Switch $S_1$ cannot be closed unless the voltage from rectifier 18 is equal to the excitation voltage applied to inverter 22 from source 20. As will be obvious, these two voltages may be readily equalized by controlling the excitation voltage at the input to inverter 22 or by controlling the output of the rectifier or both. Once the rectified voltage derived from the stator of machine 12 is equal to the excitation voltage at the input to inverter 22, switch $S_1$ can be closed and the system becomes essentially self-excited so that source 20 can now be removed.

As the connected load increases, a new equilibrium value of voltage $V_2$ will establish itself to accommodate the load demands. Hence, the voltage controls in the inverter and rectifier must be so arranged as to compensate for the changes in $V_2$ due to load and speed variations and for the inherent regulation characteristics of the frequency changer under varying load conditions.

The reactive power demands of induction machines 10 and 12, as necessitated by the magnetic energy storage in the magnetizing and leakage reactances, and any reactive power demands imposed by nonunity power factor loads, cannot be supplied by the induction generator itself. The system of the present invention can, however, supply such loads. That is, in accordance with the present invention, inverter 22 is capable of supplying reactive power demands by absorbing and delivering energy.

As previously noted, the present invention may also operate as a variable-speed motor system. In the motor mode, machine 10 is fed by a constant-frequency polyphase power supply and operates as an induction motor running below synchronous speed. The slip-frequency power generated in machine 10 supplies the rotor losses of machine 10 and feeds the second stage machine 12. Machine 12, in turn, operates as a second induction motor which is fed electrically through its rotor; stator power of machine 12 being fed back into the main power supply after frequency conversion. The control of speed is achieved by adjustment of the frequency changer voltage ratio. The operation of the two-stage induction motor system of the present invention is very similar to that of a single-stage motor in which rotor slip power is fed back to the line after proper frequency conversion. The main advantages of the two-stage version are the absence of slip rings and presence of higher input frequencies to the frequency changer. The torque-speed characteristics of the two-stage motor are essentially linear, the control action being to shift the normal torque-speed curve of the induction motor along the slip axis so that the system exhibits characteristics similar to those of a Ward-Leonard drive. It is to be noted that the design of frequency changer 16 is simplified when the two-stage induction machine operates as a motor. Thus, in the motor mode of operation, frequency changer may comprise merely a line-voltage commutated inverter and polyphase rectifier. It is to be noted that, in accordance with the present invention, the two-stage induction motor cannot be operated above synchronous speed since the rectifier section of frequency changer 16 prevents reversal of power flow.

To summarize some of the advantages of the present invention, in the generator mode of operation, the present double-induction machine system generates efficiently a constant frequency without the need for the generation of an adjustable frequency voltage. Through the use of a DC link type of frequency changer, the system is capable of supplying at least part of the DC load once the double-induction machine has been started and the machine may be designed and operated so as to minimize the amount of power handled by the frequency changer. In this respect, the stator-to-rotor turns ratios of the two stages of the double-induction machine may be selected so that the machines act as transformers thereby eliminating the need to employ transformers in the frequency changer.

In the motor mode of operation, the present double-induction machine system offers the advantage of being able to provide closely controlled speed from a fixed frequency supply with a high conversion efficiency and a relatively large power factor. The foregoing is achieved with rotating machinery which does not employ slip rings and the system exhibits desirable torque-speed characteristics well known Ward-Leonard drive.

While a preferred embodiment has been shown and described, various modifications and substitutions may be made thereto without departing from the spirit and scope of the present invention. Accordingly, it is to be understood that the present invention has been described by way of illustration and not limitation.

I claim:

1. An induction machine system comprising:
    a first induction machine having a rotor and polyphase rotor winding associated therewith, said first machine also having a stator winding:
    a second induction machine having a rotor and polyphase rotor winding associated therewith, said second machine also having a stator winding;
    a second induction machine having a rotor and polyphase rotor winding associated therewith, said second machine also having a stator winding;
    means mounting said first and second machine rotors for rotation with the same shaft;
    means interconnecting said first and second machine rotor windings in reverse phase sequence;
    frequency changer means including a rectifier for connecting the stator winding of said second machine to the stator winding of said first machine; and
    means connecting said first machine stator winding and the output of said frequency changer to a polyphase transmission line whereby power may be delivered to or taken from said system.

2. The apparatus of claim 1 wherein said frequency changer comprises:
    a rectifier connected to the stator winding of said second machine; and
    a polyphase static inverter having its input terminals connected to said rectifier and its output terminals connected to said transmission line and said first machine stator winding.

3. The apparatus of claim 2 wherein said frequency changer further comprises:

a source of DC voltage connected to the input terminals of said inverter for supplying starting excitation to said first machine via said inverter.

4. The apparatus of claim 2 further comprising:
    switch means for disconnecting said rectifier from said inverter.

5. The apparatus of claim 3 further comprising:
    switch means for disconnecting said rectifier from said inverter.

6. A process for the generation of constant-frequency power with a variable-speed prime mover comprising the steps of:
    mounting first and second polyphase, wound-rotor induction machines on the same drive shaft;
    electrically connecting the rotors of the machines in reverse phase sequence;
    rectifying the voltage induced in the stator winding of one of the machines;
    inverting the rectified stator voltage to a constant frequency alternating voltage of a selected magnitude;
    delivering the constant frequency alternating voltage to the stator winding of the other machine; and
    delivering power from the stator windings of both machines to a load.

7. The process of claim 6 comprising the further step of:
    supplying energization to the stator winding of the said other machine for starting purposes.

8. The process of claim 7 wherein the step of supplying starting energization comprises:
    electrically isolating the stator winding of said one of the machines from the stator winding of said other of the machines;
    inverting the output voltage of an external direct current source to provide an energizing voltage for the said other machine; and
    reconnecting the stator winding of said one of said machines to the system whereby the voltage induced therein will be rectified and inverted and the machines will be self-excited.

9. The process of claim 8 wherein the step of reconnecting comprises:
    matching the rectified stator winding induced voltage and the external source voltage prior to inverting; and
    delivering the rectified stator winding induced voltage for inversion to a constant-frequency voltage.

10. The process of claim 8 further comprising;
    supplying a direct current load from the external source and with power from the stator winding of the said one of said machines after rectification.

11. A process for providing, from a constant-frequency source of electrical energy, a variable speed mechanical output comprising:
    mounting first and second polyphase, wound-rotor induction machines on a common drive shaft;
    electrically connecting the rotors of the machines in reverse phase sequence;
    delivering energy at constant frequency from the source to the stator winding of the first machine whereby the first machine will operate as an induction motor;
    rectifying the voltage induced the the second machine stator;
    inverting the rectified second machine stator voltage to the energy source frequency;
    connecting the converted second machine stator voltage to the source; and
    varying the magnitude of the converted voltage whereby the rotational speed of the machines will vary.

12. The process of claim 11 wherein the step of varying the magnitude of the converted second machine stator voltage comprises adjusting the rectified second machine stator voltage.